United States Patent
Chao et al.

(10) Patent No.: US 7,130,707 B2
(45) Date of Patent: *Oct. 31, 2006

(54) SYSTEM AND METHOD FOR MANUFACTURING PLANNING AND CONTROL

(75) Inventors: Jen-Lin Chao, Hsinchu (TW); Chen-Wei Hsu, Hsinchu (TW); Chin-Yung Chang, Hsinchu (TW); Chiang-Chou Lo, Hsinchu Hsien (TW); Wei-Chuan Huang, Hsinchu (TW); Cheng-Hsi Wen, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 395 days.

This patent is subject to a terminal disclaimer.

(21) Appl. No.: 10/739,843

(22) Filed: Dec. 18, 2003

(65) Prior Publication Data

US 2005/0137732 A1   Jun. 23, 2005

(51) Int. Cl.
 *G06F 19/00* (2006.01)
(52) U.S. Cl. .......................... 700/100; 700/95
(58) Field of Classification Search ............... 700/100, 700/95, 97, 99
See application file for complete search history.

(56) References Cited

U.S. PATENT DOCUMENTS

| | | | | |
|---|---|---|---|---|
| 6,415,195 | B1* | 7/2002 | Gleditsch et al. | 700/99 |
| 6,711,550 | B1* | 3/2004 | Lewis et al. | 705/10 |
| 6,728,586 | B1* | 4/2004 | Chang et al. | 700/99 |
| 2004/0267395 | A1* | 12/2004 | Discenzo et al. | 700/99 |

* cited by examiner

*Primary Examiner*—Zoila Cabrera
(74) *Attorney, Agent, or Firm*—Thomas, Kayden, Horstemeyer & Risley (57) ABSTRACT

A customer-orientated manufacturing planning and controlling system. An order management module is programmed to receive an order for a product and reserve a capacity for the order based on a capacity model that considers a plurality of capacity vectors in a production system. A plan engine generates a fixed production schedule for the order based on the capacity model. A priority management engine provides a priority for the order. A production schedule monitor and evaluation module determines whether the order in process conforms to the fixed production schedule by statistical process control (SPC) and whether to adjust the fixed production schedule and to adjust the priority based on a dynamic achievement model of historical fixed production schedules, based on historical production information in a production database storing production information of the production system.

60 Claims, 11 Drawing Sheets

SYSTEM AND METHOD FOR MANUFACTURING PLANNING AND CONTROL

BACKGROUND OF THE INVENTION

1. Field of the Invention

The present invention relates to manufacturing management, and in particular to a system and method of manufacturing planning and control with a fixed planning schedule for an order using a statistical process control (SPC) method.

2. Description of the Related Art

Supply chain is important for modern enterprises, systemizing purchase of materials, transformation of materials into intermediate and finished products, and distribution of finished products. In the supply chain, customers transmit requests (demands) consisting of a request for a particular quantity of a product by a specific date to a manufacturer, and the manufacturer plans its manufacturing schedule according to these received requests to satisfy each customer.

Supply chain management has become an important issue to meet the goals of reduced inventory and increased productivity. Conventionally, resources and facilities of a production system are regarded as limiting factors. Therefore, not every customer request may be met, since some may be promised, some may suffer inadequate supply, and others rejected. Consequently, effective demand and capacity management in supply chain management without excess capacity loss has become fundamental and critical for most manufacturing and distribution organizations.

Supply chains exist in most manufacturing environments, although the complexity of the chain may vary greatly from industry to industry and firm to firm. For integrated circuit (IC) foundries, the manufacturing process of each IC product is complicated and varies and the cost of wafers and capacity is relatively high.

Many commercial supply chain solution providers provide packaged systems for clients to install and follow, such as i2 technology or ADEXA Inc. For a manufacturer or a factory, a production scheduling engine is usually embedded in the systems to arrange resources and materials for a production plan. The production scheduling engines provide a master production schedule (MPS) for the manufacturer or factory to follow. However, conventional production scheduling engines are designed to meet the best interests of the manufacturer or factory. More specifically, conventional production scheduling engine are programmed to generate a minimum-cost, optimal-capacity, and low-inventory MPS.

For IC foundries, conventional production scheduling engines recalculate and generate an updated MPS to optimize resources and capacity when receiving new orders. When lots are running (hereinafter referred as work-in-process, WIP), the MPS is still changed, indicating rolling production schedules for running lots for optimization of foundry resources. It becomes difficult to promise delivery of their lots because of the rolling MPS.

When a preferable plan engine is provided so that the rolling MPS can be accurately obtained, however, manufacturing execution in the production system may not match the manufacturing plan, due to problems in execution, such as unfamiliarity on the part of the manufacturer with the production system, or problems in planning, such as ill-defined parameter settings provided to the plan engine.

Generally, a checking process between manufacturing plan and execution in the production system is required to match the plan and execution. However, it is difficult to determine whether problems with the production system occur in the planning engine or manufacturing execution when a significant deviation is found. Specifically, problems may occur in execution, but the manufacturing plan may be mistakenly modified to match the execution.

For clients, the uncertainty can severely disrupt transport and inventory planning and management.

SUMMARY OF THE INVENTION

Accordingly, an object of the invention is to provide a computer implemented system and method for manufacturing planning in a production system, which generates a fixed production schedule for the subsequent production system.

Another object of the invention is to provide a computer implemented system and method for checking deviation between manufacturing plan and execution in the production system to match the plan and execution using a statistical process control (SPC) method, in which a matching quality of the manufacturing process is preferably monitored and controlled.

Another object of the invention is to provide a production schedule adjustment for IC production to evaluate the fixed production schedule.

To achieve the above and other objects, the invention is directed to novel systems and methods for overcoming conventional manufacturing planning and control problems. In one embodiment, a computer implemented planning system for a production system comprises a capacity model considering a plurality of vectors of manufacturing capacity; an order management module to receive an order for a product and reserve a capacity for the order based on the capacity model; a plan engine to generate a fixed production schedule for the order based on the capacity model; and a production schedule monitor and evaluation module to monitor whether the order in process conforms to the fixed production schedule and determine whether to adjust the fixed production schedule when the order in process deviates from the fixed production schedule.

Preferably, a dynamic achievement model of historical fixed production schedules is introduced into the above system to evaluate the fixed production schedule, wherein the model is built based on historical production information in the production database.

In another embodiment, a method provides manufacturing planning and control in an IC foundry. An order of an IC product is received. A capacity is reserved and a fixed production schedule is generated for the order. The order is manufactured following the fixed production schedule. The invention further provides a method to evaluate conformity between fixed production schedules and actual progress.

One feature of an embodiment of the present invention is fixed production schedule generation. The production system is designated to follow the fixed production schedule to manufacture an order of lots. It allows the production system to fasten on the fixed planning schedule to deliver the order of lots on time. In addition, it also allows the production system to promise the client a delivery date.

Another feature of an embodiment of the present invention evaluates the fixed planning schedule according to history. The conformity of fixed planning schedules and the actual progress can be evaluated and adjusted accordingly.

In another embodiment, a computer implemented planning system for a production system comprises a capacity model considering a plurality of vectors of manufacturing capacity; an order management module to receive an order for a product and reserve a capacity for the order based on the capacity model; a plan engine to generate a fixed production schedule for the order based on the capacity model; a priority management module to assign a priority to the order in process; and a production schedule monitor and evaluation module to determine whether the order in process conforms to the fixed production schedule by statistical process control (SPC) and whether to adjust the fixed production schedule and to adjust the priority when the order in process deviates from the fixed production schedule.

In still another embodiment, a method provides execution matching in an IC foundry. An order of an IC product is received. A capacity is reserved and a fixed production schedule is generated for the order. A priority is provided for the order. The order is manufactured with the priority following the fixed production schedule. The method further evaluates conformity between fixed production schedules and actual progress with statistical process control (SPC). Further, the method determines whether to adjust the priority for the order in process with SPC. It also evaluates the fixed planning schedule according to history. The conformity of fixed planning schedules and the actual progress can be evaluated and adjusted accordingly.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

As will be appreciated by persons skilled in the art from the discussion herein, the present invention has wide applicability to many manufacturers and many industries. For discussion purposes, illustration is made herein to semiconductor foundry manufacturing (i.e., wafer fabrication in an IC foundry). However, the present invention is not limited thereto.

As summarized above, the present invention is directed to novel systems and methods of overcoming manufacturing planning and control problems.

Embodiment I: Fixed MPS Generation

Figure 1:
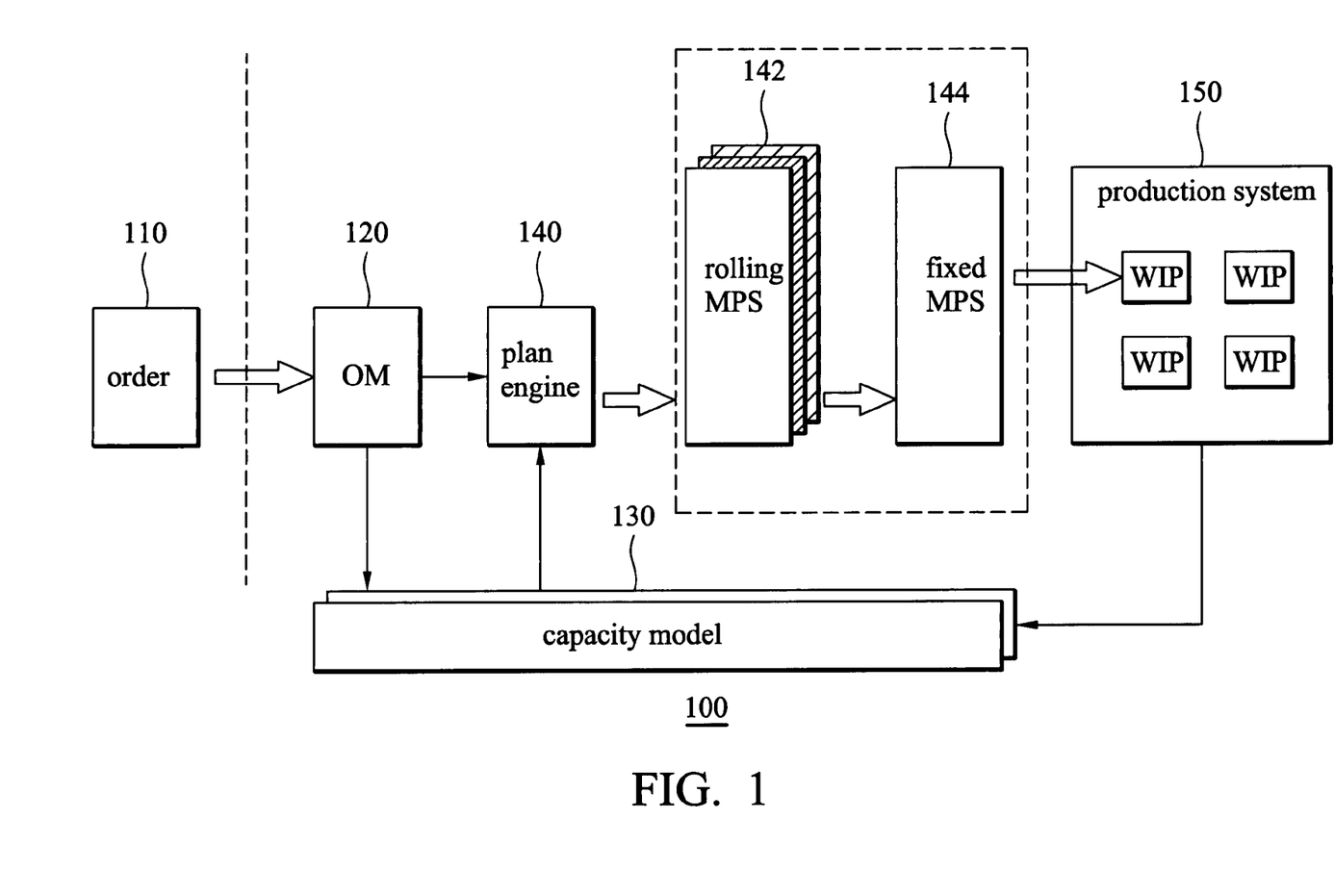
FIG. 1 is a schematic view of the system structure for manufacturing planning in an IC foundry to generate a fixed production schedule according to one embodiment of the invention.

FIG. 1 is a schematic system structure for manufacturing planning in an IC foundry, which generates a fixed production schedule to achieve a customer orientation production according to one embodiment of the invention. As shown in FIG. 1, when a customer (not shown) purchases an order 110 of a product from an IC foundry 100, e.g. 200 count wafers of graphic chips, an order management module (OM) 120 receives the order 110. Generally, the order 110 can be divided into a plurality of lots based on the processing unit. For example, the order of 200 count wafers is divided into 8 lots based on a unit of 25 count wafers as one lot. The order management module (OM) 120 reserves a capacity for the order 110 based on a capacity model 130 in a macrocosmic view of the IC foundry. The capacity model 130 considers a plurality of capacity vectors in the IC foundry, such as fabrication technology, product characteristics, route information for products and/or customer priority. The order management module (OM) 120 books a capacity for the order based on the capacity model without specifying a detail production schedule.

After the order management module (OM) 120 reserves a capacity for the order 110, the plan engine 140 further generates a production schedule for the order 110 based on the capacity model 130 when the wafer-start date approaches. Generally, the production schedule comprises a detailed production flow, time schedule and a project-out-date of the order. In a preferred embodiment, the plan engine 140 generates a rolling master production schedule (hereinafter referred as MPS) 142 for the order 110 for planning optimization until the production system 150 starts to run the lots of the order 110. More specifically, the plan engine 140 continually updates the production schedule (MPS) 142 according to the latest production status and purchase of orders of the IC foundry before a run of the lots of order 110 begins. Plan engine 140 assigns the latest MPS 142 for the order 110 as a fixed MPS 144 for production. The production system 150 is assigned to follow the fixed MPS 144 to fabricate all lots of the order (hereinafter referred to as work-in-process, lots-in-process, or order-in-process) and the plan engine 140 does not generate any additional rolling MPS for production system 150 to follow while the order of lots is fabricated. Preferably, the production system 150 further feeds back the fabrication progress of work-in-process to the capacity model 130 for adjustment.

Figure 3A:
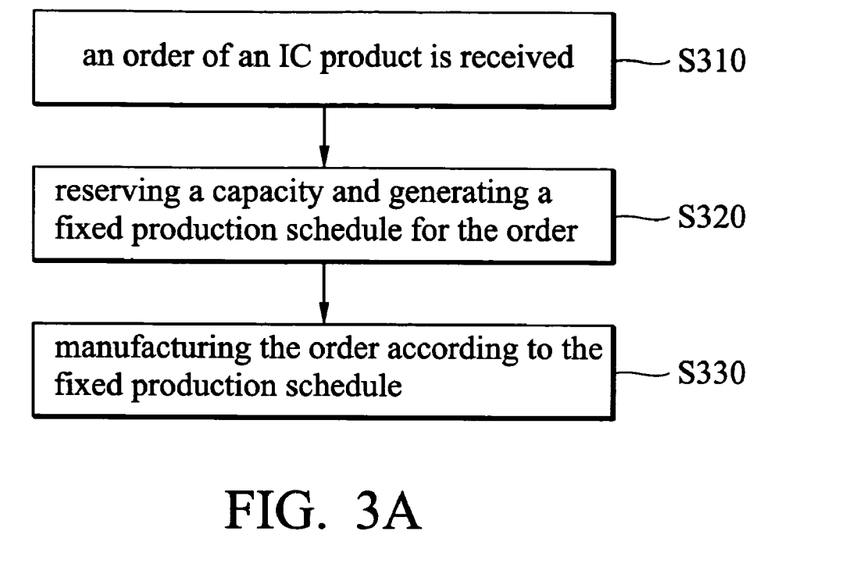
FIG. 3A is a flowchart of a method of manufacturing planning and control in an IC foundry according to the system in FIG. 1.

FIG. 3A illustrates a flowchart of a method of manufacturing planning and control in an IC foundry according to the system in FIG. 1. In step S310 an order of an IC product is received by the order management module (OM) 120. The plan engine 140 reserves a capacity and generates a fixed production schedule for the order when beginning fabrication in step S320. The order is then manufactured following the fixed production schedule in step S330.

Conventionally, the MPS of the order is still rolled and updated after the order is in process to optimize production efficiency. A disadvantage here is that the lots of the order may be assigned with a rolling MPS for the best interest and flexibility of the production system, such as lower cost or labor, and consequently the lots are delivered at separate times. In addition, the customers are therefore unable to confirm receipt of their order since the MPS thereof is continually updated according to the latest status of the production system. The present invention provides a fixed MPS generation system and method for a production system to follow and achieve on-time delivery of the lots of an order.

Embodiment II: Fixed MPS Evaluation and Adjustment

Figure 2:
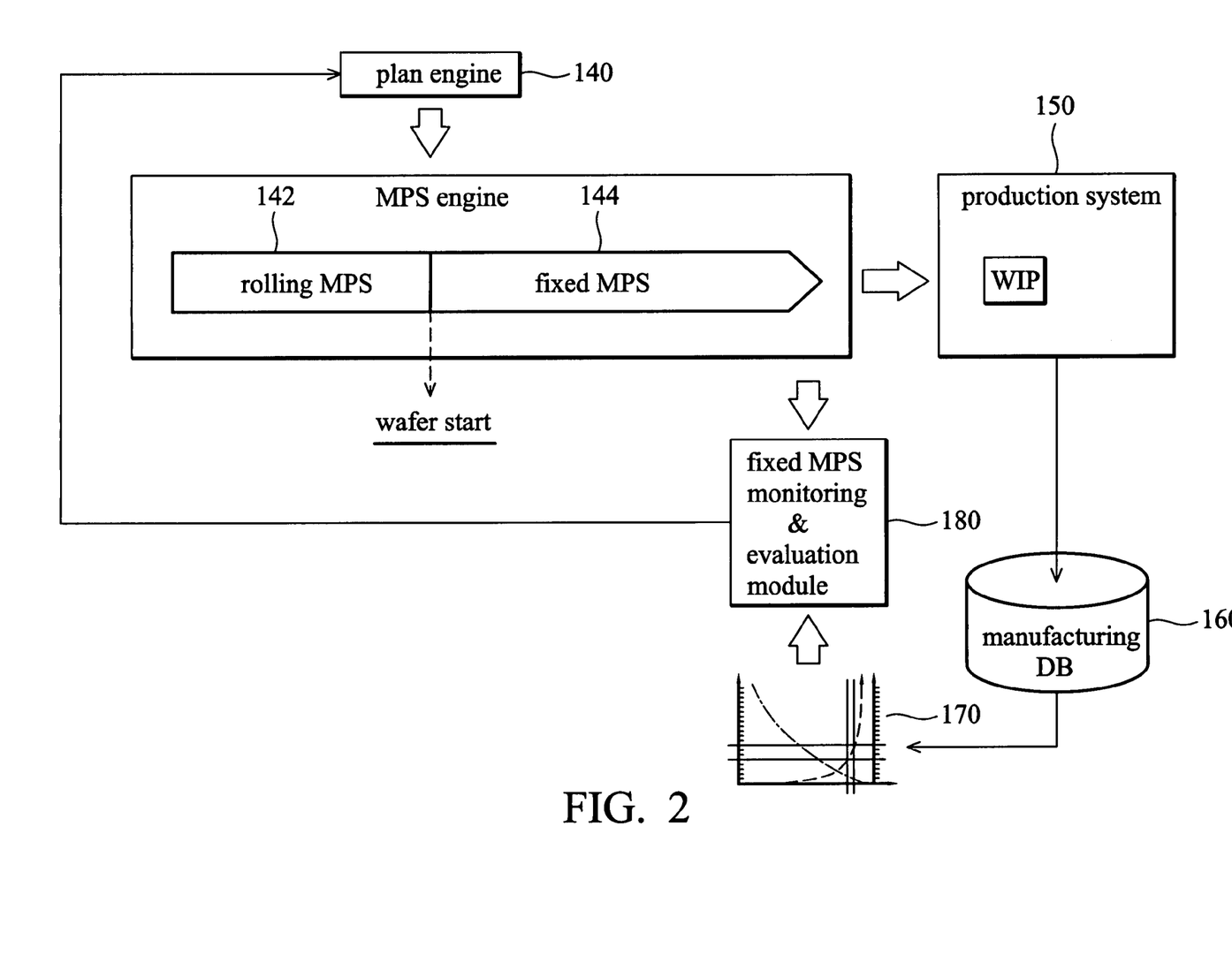
FIG. 2 is a schematic view of the system structure for evaluating a fixed production schedule in an IC foundry according to one embodiment of the invention.

FIG. 2 is a schematic system structure for evaluating a fixed production schedule in an IC foundry according to another embodiment of the invention. Plan engine 140 initially generates rolling MPS 142 for order 110 and then assigns a fixed MPS 144 when the lots of order 110 start production. A production schedule monitor and evaluation module 180 continues tracking and determining whether the lots-in-process conform to the fixed production schedule.

Figure 4:
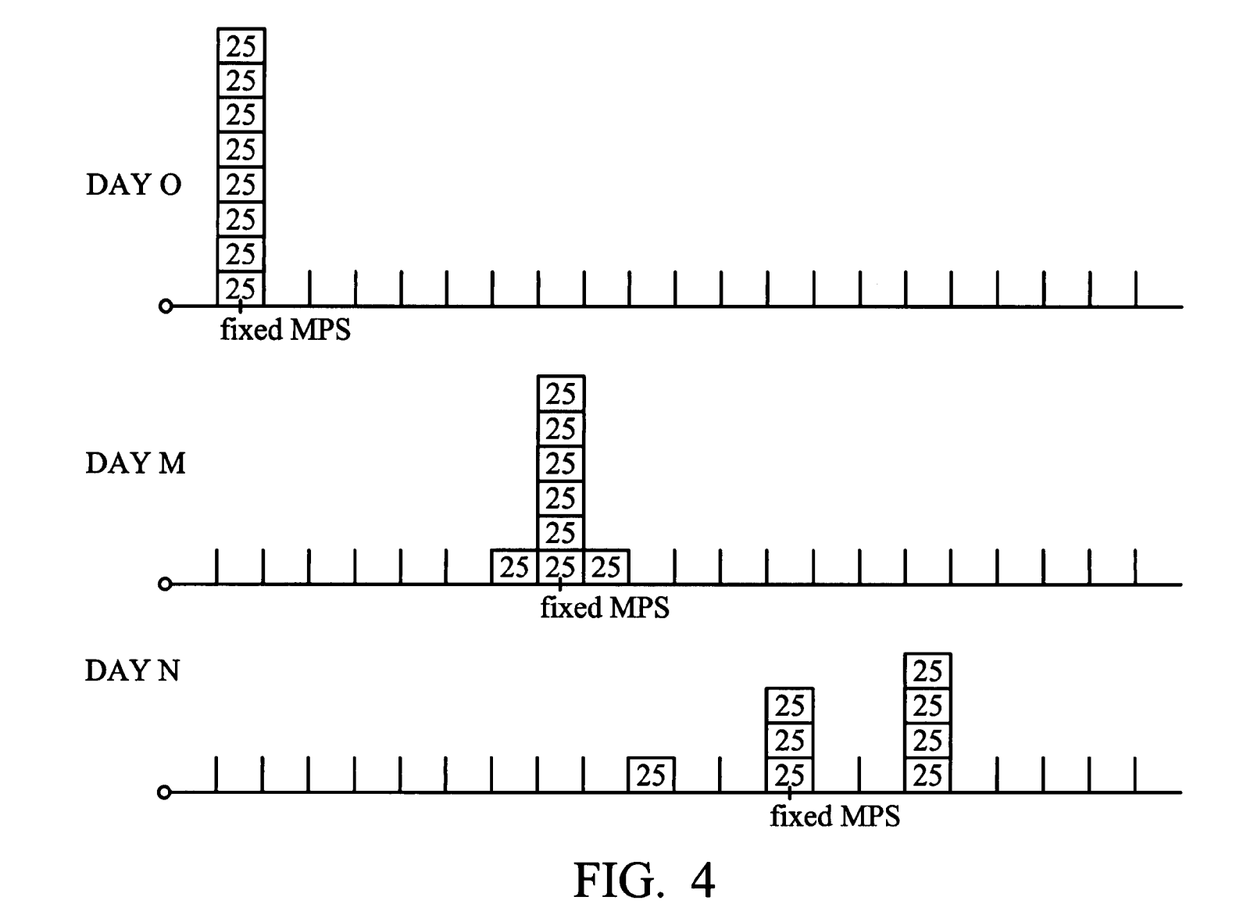
FIG. 4 is a distribution of the lots of an order-in-process according to one embodiment of the invention.

FIG. 4 illustrates a distribution of the lots of an order during processing according to this embodiment of the invention. Generally, the production system 150 follows the fixed MPS 144 to fabricate the lots of order 110. However, the lots of the order 110 may not fully conform to the fixed MPS 144. As shown in FIG. 4, the order 110 with 200 count wafers divided into 8 lots is fabricated from DAY 0. On DAY M, 6 lots are still together but one lot is ahead and another behind. On DAY N, four lots are fabricated beforehand and one lot is left behind. Only three lots thus conform to the fixed MPS 144.

The production schedule monitor and evaluation module 180 determines the distribution of the lots of the order 110 and whether to adjust the fixed production schedule 144 when the order in process deviates from the fixed production schedule.

Preferably, a dynamic achievement model 170 of historical fixed production schedules is provided as shown in FIG. 2, based on historical production information in a production database 160 for production schedule monitor and evaluation module 180 to evaluate the deviation in the order-in-process.

Figure 5:
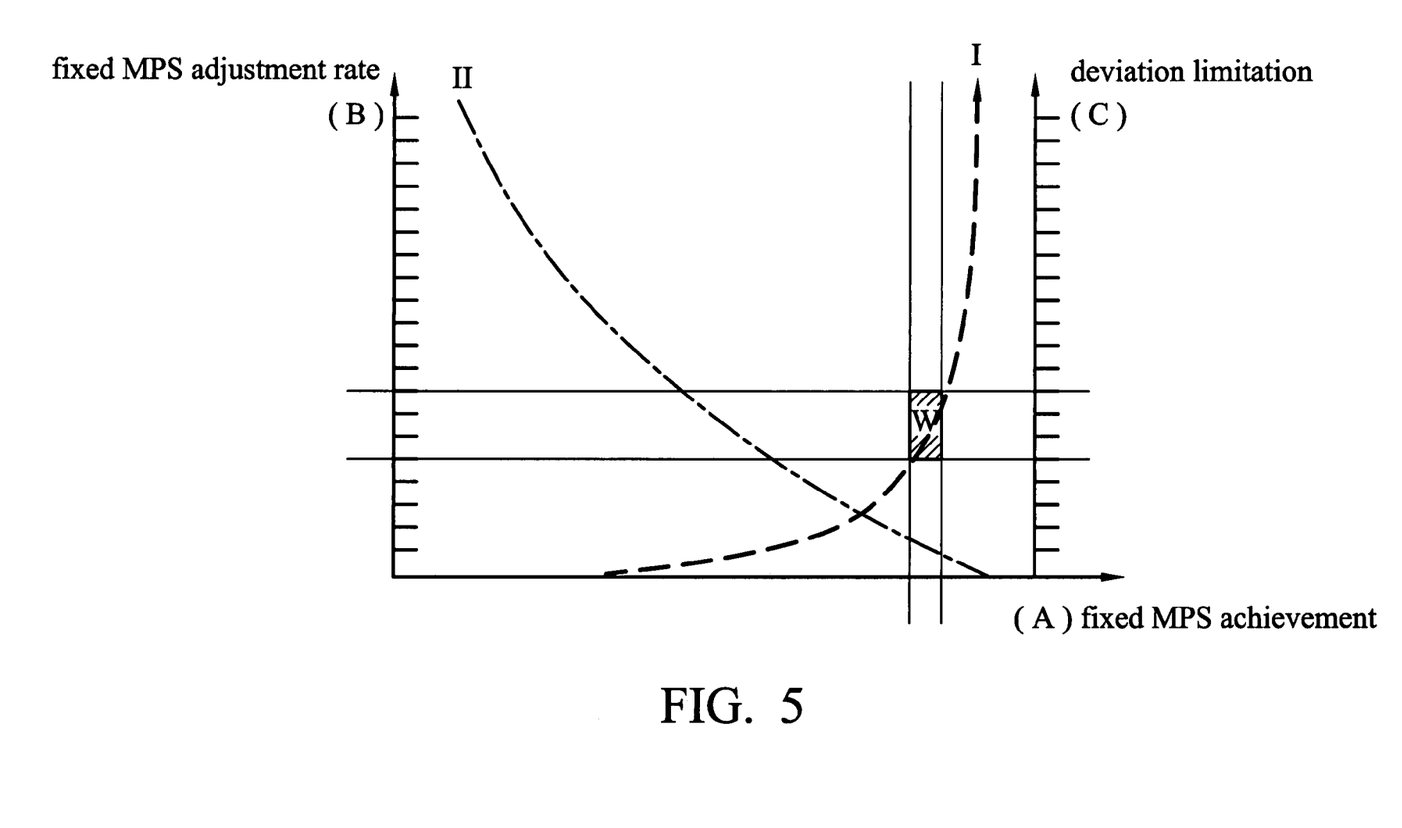
FIG. 5 is a dynamic achievement model of historical fixed production schedules according to one embodiment of the invention.

FIG. 5 illustrates a dynamic achievement model 170 of historical fixed production schedules according to one embodiment of the invention. Preferably, the dynamic achievement model 170 of historical fixed production schedules comprises a relationship between fixed production schedule achievement rate (coordinate A), fixed production schedule adjustment rate (coordinate B) and deviation limitation (coordinate C). The deviation limitation is the deviation between the fixed MPS and actual progress of which the IC foundry is capable, an indicator of its manufacturing capability.

According to historical fabrication information in one embodiment, a model of fixed MPS achievement is shown in FIG. 5. Curve I illustrates the relationship between the fixed MPS achievement rate and the fixed MPS adjustment rate. As curve I shows in FIG. 5, the more frequent the fixed MPS adjustment, the higher the fixed MPS achievement rate. Curve II illustrates the relationship between the fixed MPS achievement rate and the deviation limitation of production system 150. The higher the deviation limitation of production system 150, indicating the capability of the IC foundry to recover from the deviation, the lower the fixed MPS achievement rate.

Based on the model shown in FIG. 5, an optimal working area (W) is further defined based on the relationships to evaluate whether to adjust the fixed production schedule. The working area (W) is assigned with a range within which the fixed MPS is adjusted but improvement in the fixed MPS achievement rate is achieved and the range of the most capable deviation limitation within which the production system 150 can attain the fixed MPS. The production schedule monitor and evaluation module 180 determines whether to adjust the fixed production schedule based on the working area (W) of the dynamic achievement model when the progress of the order-in-process 110 deviates from the fixed MPS. As shown in FIG. 4, when the lots on DAY N deviate from the working area (W) of the deviation limit, a new fixed MPS of the order 110 is re-generated by the plan engine 140 according to the deviation degree and the latest status of the IC foundry for the order-in-process to follow. The working area (W) provides a range within which a low fixed MPS adjustment rate and a high fixed MPS achievement rate are obtained for the IC foundry to maintain optimum parameters of both the customers and the IC foundry.

Figure 3B:
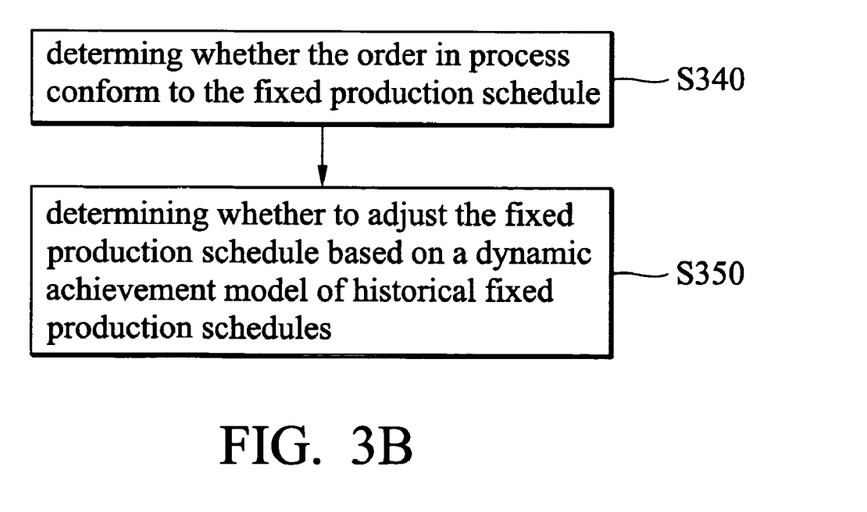
FIG. 3B is a flowchart of a method of manufacturing planning and control in an IC foundry according to the system in FIG. 2.

FIG. 3B illustrates a flowchart of a method of manufacturing planning and control in an IC foundry according to the system in FIG. 2. In step S340 the production schedule monitor and evaluation module 180 determines whether the order-in-process conforms to the fixed production schedule. If not, the production schedule monitor and evaluation module 180 determines whether to adjust the fixed production schedule based on the dynamic achievement model of historical fixed production schedules in step S360.

The above embodiment illustrates evaluation and adjustment of a production system to maintain flexibility and real-time control with the implementation of a fixed production schedule and therefore provide predictable manufacturing schedules.

The methods and system of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Embodiment III: Plan and Execution Matching

Figure 6:
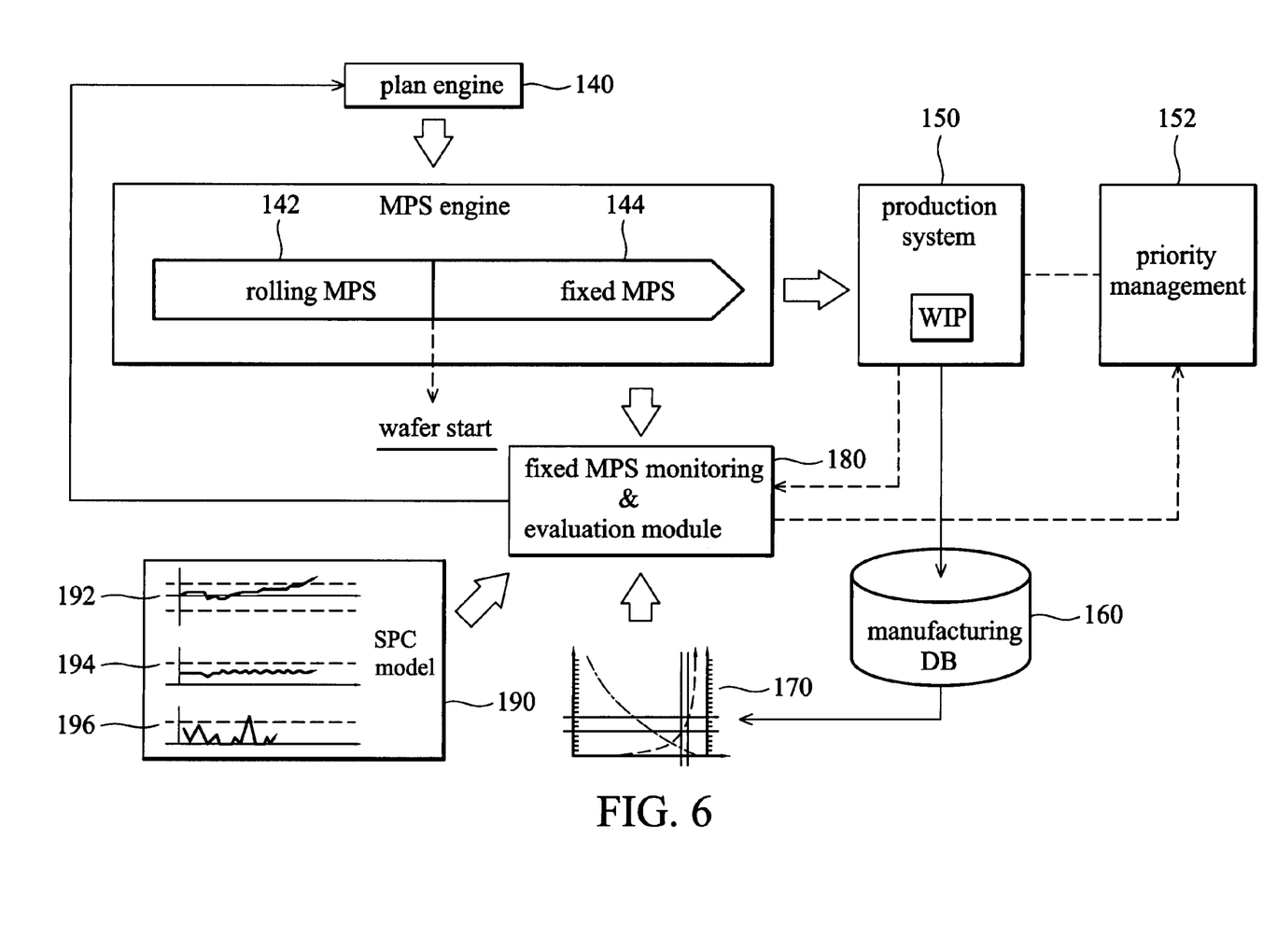
FIG. 6 is a schematic view of the system structure for matching plan and execution in an IC foundry according to one embodiment of the invention.

FIG. 6 is a schematic system structure showing another embodiment of the invention, which has a structure similar to the system in FIG. 2. The system in FIG. 6 is applied to check deviation between manufacturing plan and execution for matching plan and execution while evaluating the fixed production schedule in the IC foundry.

The plan engine 140 initially generates rolling MPS 142 for order 110 and then assigns a fixed MPS 144 when the lots of order 110 start production. The production schedule monitor and evaluation module 180 continues tracking, determining whether the lots-in-process conform to the fixed production schedule. Further, a statistical process control (SPC) model 190 is applied to provide a plurality of SPC vectors to the production schedule monitor and evaluation module 180 to continue checking the execution process status of the order-in-process and determining deviations between execution of the production system 150 and the manufacturing plan. Further, a priority management module 152 is provided to adjust the priority of lots in the production system 150.

Figure 7A:
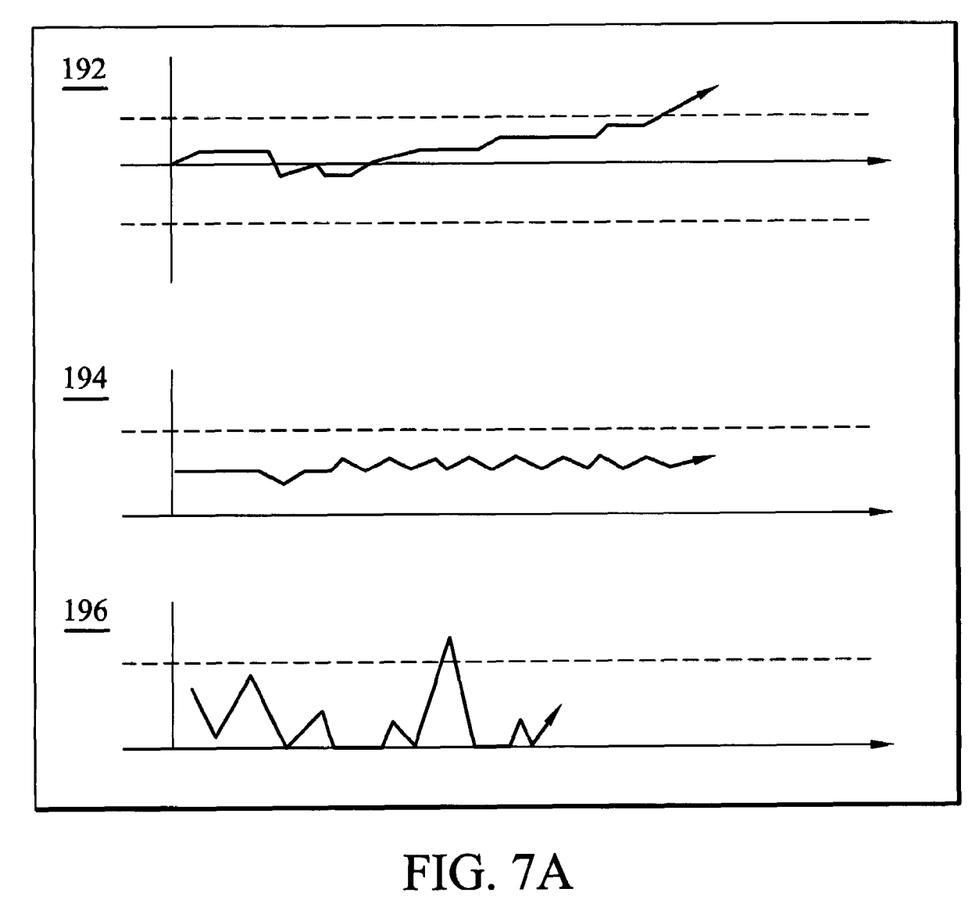
FIG. 7A is a diagram showing an embodiment of the SPC model in FIG. 6.

Specifically, the SPC vectors of the SPC model 190 can be shown in a plurality of SPC diagrams. FIGS. 7A to 7D illustrate a plurality of statistical process control (SPC) diagrams for matching quality of execution according to the system in FIG. 6. In FIG. 7A, the SPC diagrams include a mean value diagram 192, a standard deviation diagram 194, and a distribution diagram 196 of the number outings of the "out of recovery control limit" date.

The mean value diagram 192 shows a mean value vector of deviation between the fixed MPS and the manufacturing plan in a ratio of the schedule deviation/left days, which represents the feasibility of the IC foundry. The standard deviation diagram 194 shows a standard deviation vector of the deviation in a ratio of the schedule deviation/left days, which represents the stability of the IC foundry. Further, the distribution diagram 196 shows the number of the out of recovery control limit in a ratio of the schedule deviation/left days, which represent the delay occurrence rate of the IC foundry.

It should be mentioned that the SPC diagrams 192, 194 and 196 in FIG. 7A show deviation between manufacturing execution and the fixed MPS under control. That is, the production system in FIG. 7A is stable.

Figure 7B:
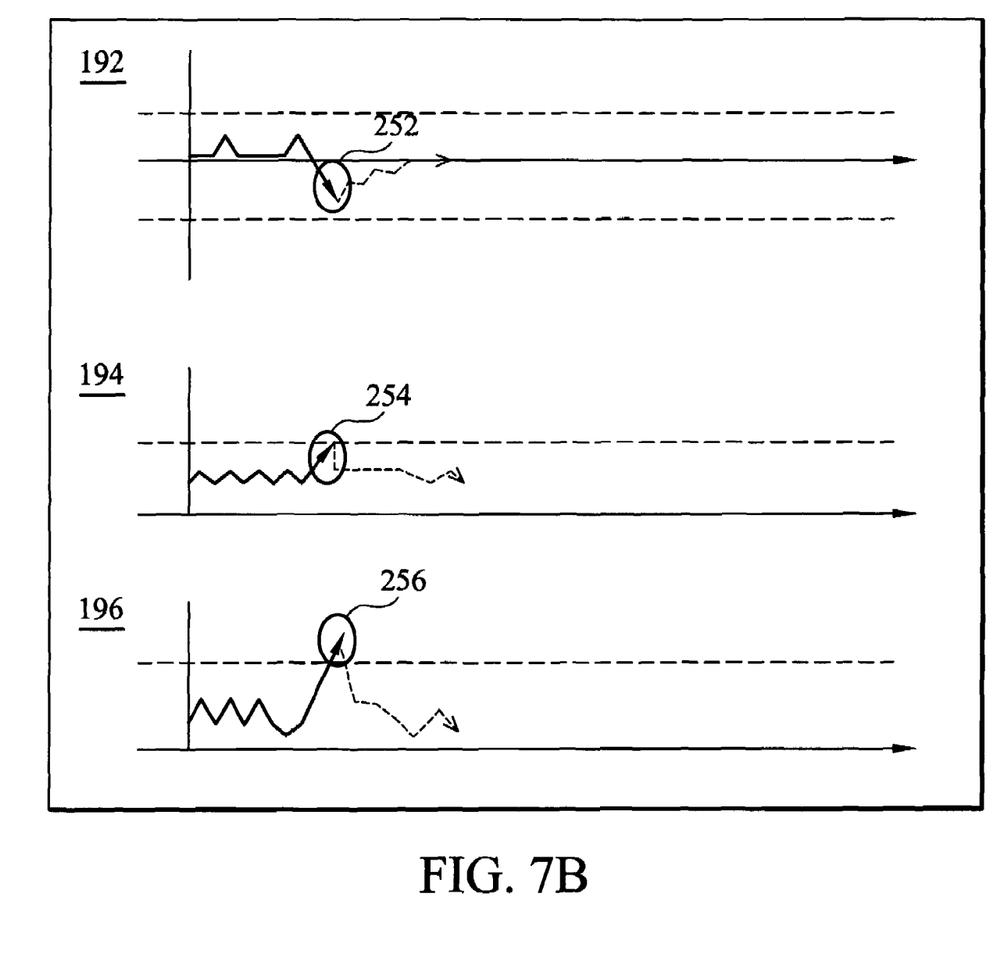
FIG. 7B is a diagram showing another embodiment of the SPC model in FIG. 6, in which a special demand is required.

However, manufacturing execution in the production system may not match the manufacturing plan. In FIG. 7B, when a special demand from a customer occurs, the SPC diagrams 192, 194 and 196 show the impact of the special demand. An emergency order corresponding to the special demand is applied during processing according to this embodiment of the invention. Referring to FIG. 6, generally, the production system 150 follows the fixed MPS 144 to fabricate the lots of order 110. Since the emergency order is applied, the lots of the order 110 do not fully conform to the fixed MPS 144. In this case, a negative mean value deviation 252 occurs in the mean value diagram 192, and a standard deviation rise 254 occurs in the standard deviation diagram 194. Further, a rise 256 of the number of the out of recovery control limit can occur in the distribution diagram 196 to show increased delay.

When the special demand from the customer occurs, the production system 150, i.e. the manufacturer, has to eliminate delay related to the rise 256 and then balance the schedule deviation related to the standard deviation rise 254. In this case, the production schedule monitor and evaluation module 180 control the priority management module 152 to adjust the priority of lots in the production system 150.

Figure 8:
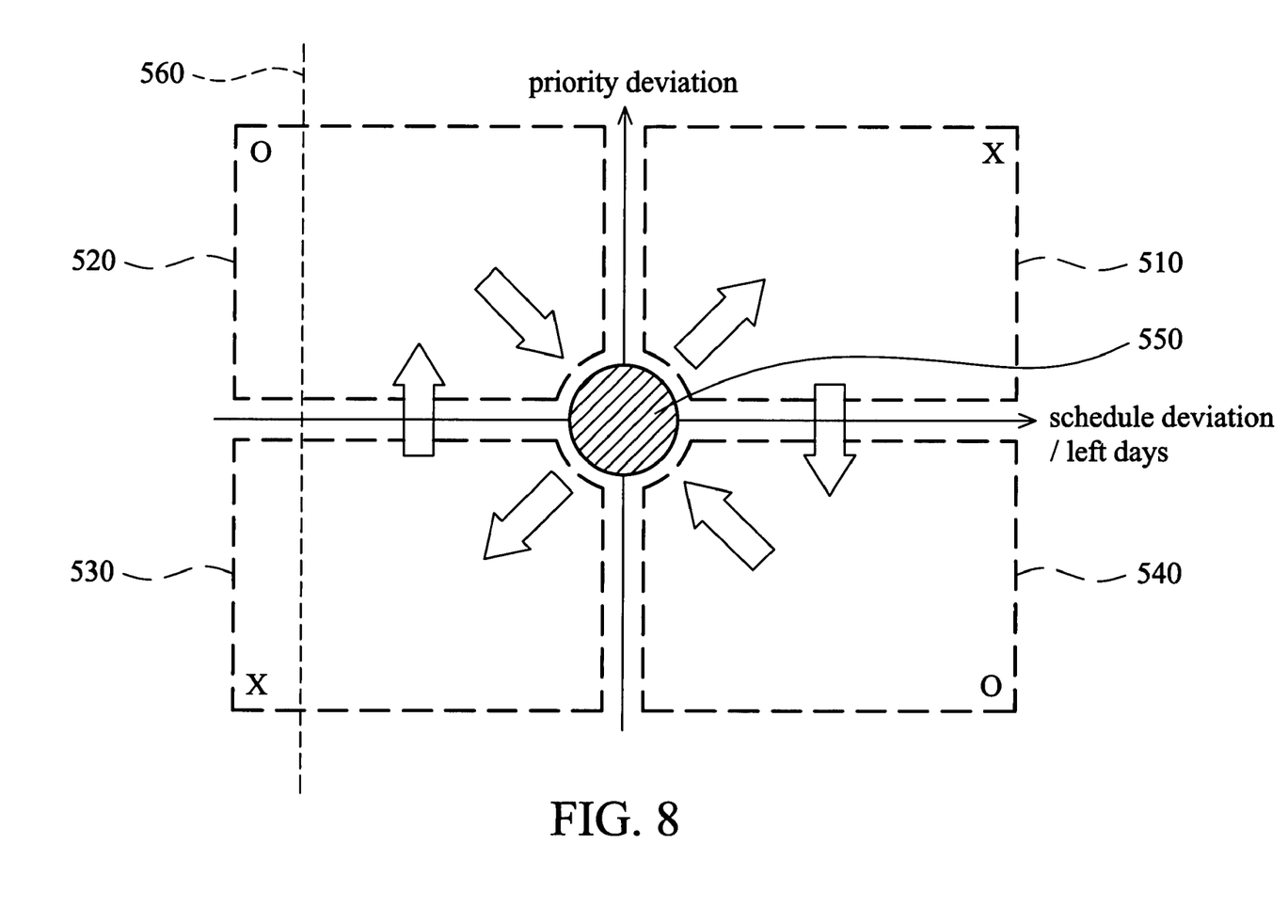
FIG. 8 is a diagram showing the relationship between priority deviation and fixed production schedule.

FIG. 8 is a diagram showing the relationship between priority deviation and fixed production schedule deviation. In FIG. 8, the horizontal axis represents the ratio of the schedule deviation/left days, and the vertical axis represents the priority deviation. According to FIG. 8, the manufacturing status of lots can be assigned to several types, hereafter described in detail.

When the rolling MPS approaches the fixed MPS and the manufacturing priority approaches the scheduled plan, the lots of the order-in-process are stable as shown in area 550. When the rolling MPS falls ahead of the fixed is MPS and the manufacturing priority falls under the scheduled plan, the lots of the order-in-process are in convergence as shown in area 540. Meanwhile, when the rolling MPS falls behind the fixed MPS and the manufacturing priority overreaches the scheduled plan, the lots of the order-in-process are also in convergence as shown in area 520. In either area 550 of the stable status or areas 520 and 540 of the convergence status, the priority can be maintained.

However, when the rolling MPS falls ahead of the fixed MPS and the manufacturing priority overreaches the scheduled plan, the lots of the order-in-process are diffused as shown in area 510, and capacity consumption needs to be reduced. Thus, the priority management module 152 reduces the priority to achieve capacity consumption reduction, so that the lots of the order-in-process move from area 510 toward area 540.

Meanwhile, when the rolling MPS falls behind the fixed MPS and the manufacturing priority falls under the scheduled plan, the lots of the order-in-process are also diffused as shown in area 530, and capacity consumption needs to be increased. Thus, the priority management module 152 increases the priority to achieve capacity consumption increase, so that the lots of the order-in-process move from area 530 toward area 520.

With the diagram in FIG. 8, a preferable priority setting percentage of the lots of the orders can be calculated, the trend of the preferable priority setting percentage being an important index for the manufacturing ability.

Figure 9A:
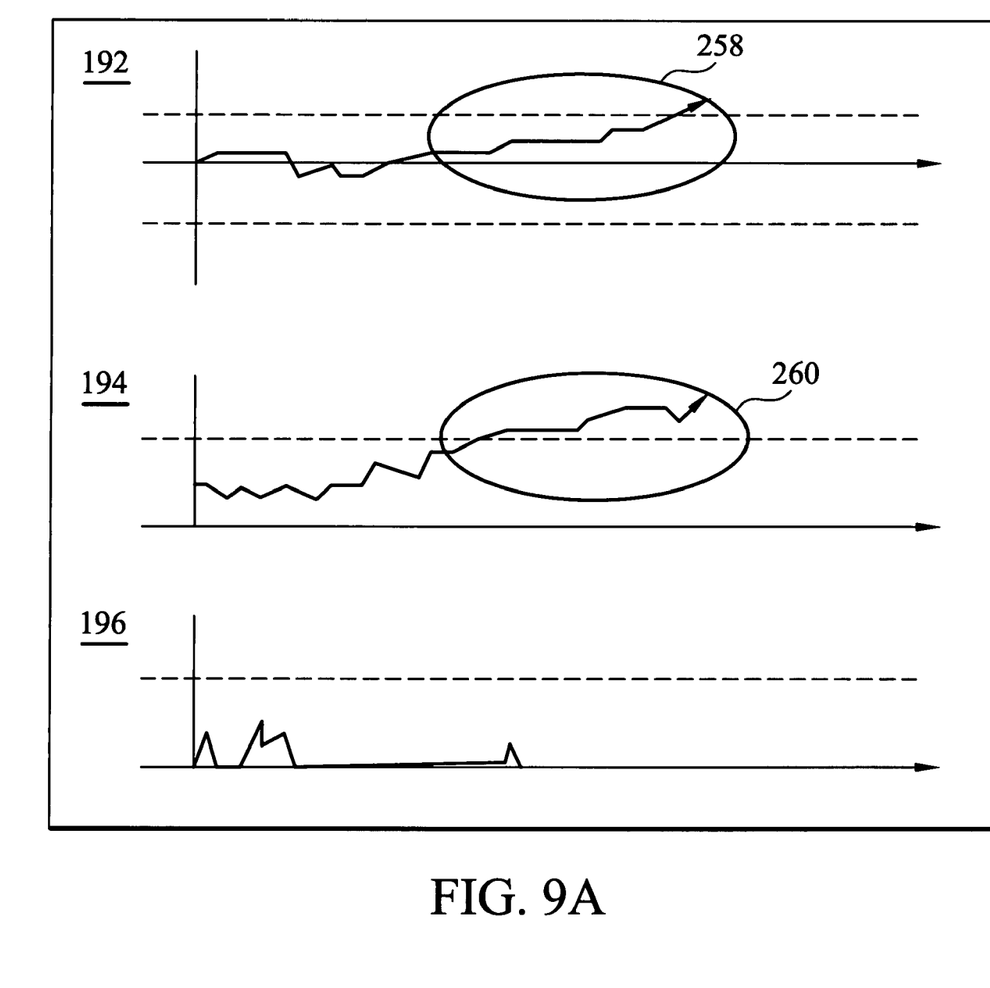
FIG. 9A is a diagram showing another embodiment of the SPC model in FIG. 6, in which the execution is under loaded.

Another case of the impact of the plan is manufacturing underloading. When the parameter settings are not well-defined in the plan engine, or the manufacturing department puts off the scheduled plan, underloading occurs, with the impact shown in SPC diagrams 192, 194 and 196 as shown in FIG. 9A. A mean value rise 258 occurs in the mean value diagrams 192, and a standard deviation rise 260 occurs in the standard deviation diagram 194. When underloading is detected, the diagram as in FIG. 8 can check the preferable priority setting percentage of the manufacturing department, thus determining whether the underloading problem relates to manufacturing planning or execution of the manufacturing department.

Figure 9B:
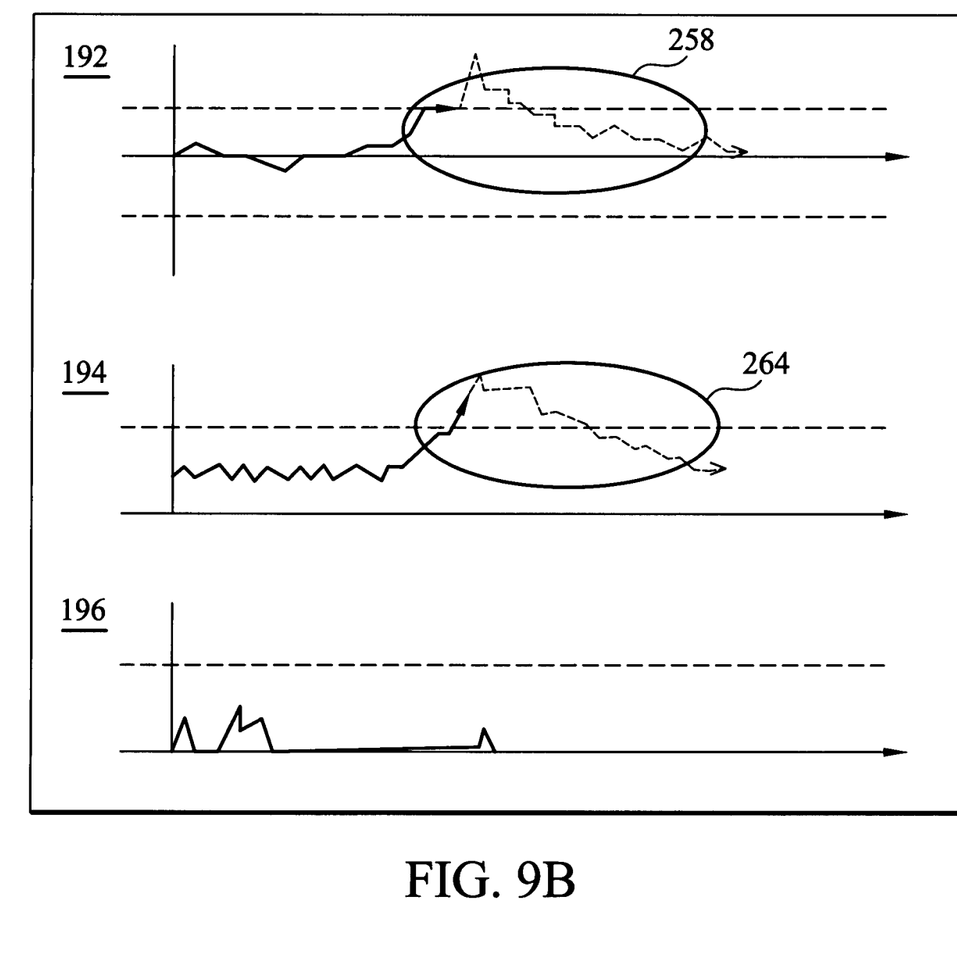
FIG. 9B is a diagram showing another embodiment of the SPC model in FIG. 6, in which adjustment of the planning parameter is performed after the execution is under loaded.

When problems occur in manufacturing planning, adjustment of the parameter settings of the plan engine 140 is required. Generally, the parameter settings of the plan engine 140 include the cycle time. Since the cycle time is too long to cause underloading, the cycle time should be reduced to reduce the mean value rise 258 and the standard deviation rise 260 of the SPC diagrams 192 and 194 to move below the control line, as shown in 262 and 264 in FIG. 9B.

Preferably, a dynamic achievement model 170 of historical fixed production schedules is provided as shown in FIG. 6, based on historical production information in a production database 160 for production schedule monitor and evaluation module 180 to evaluate the deviation in the order-in-process.

Thus, with the above-mentioned system and method, deviation between manufacturing planning and execution can be reduced, and the stability of the execution is maintained with the reasonable plan, which forms a virtuous circle.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer implemented system for manufacturing planning in a production system, comprising:
   a capacity model, considering a plurality of capacity vectors in the production system;
   an order management module to receive an order for a product and reserve a capacity for the order based on the capacity model;
   a plan engine to generate a fixed production schedule for the order based on the capacity model; and
   a production schedule monitor and evaluation module to determine whether the order in process conforms to the fixed production schedule and whether to adjust the fixed production schedule when the order in process deviates from the fixed production schedule,
   wherein the production system manufactures the order in accordance with the fixed production schedule.

2. The system as claimed in claim 1, wherein the production system is an integrated circuit (IC) foundry.

3. The system as claimed in claim 2, wherein the plan engine generates a new fixed production schedule for the order in process according to a deviation when receiving an adjustment determination from the production schedule monitor and evaluation module.

4. The system as claimed in claim 2, wherein the order of the product is divided into a plurality of lots for production.

5. The system as claimed in claim 4, further comprising a dynamic achievement model of historical fixed production schedules for the production schedule monitor and evaluation module to refer and determine the fixed production schedule adjustment accordingly.

6. The system as claimed in claim 5, wherein the dynamic achievement model of historical fixed production schedules comprises a relationship between fixed production schedule achievement rate and fixed production schedule adjustment rate.

7. The system as claimed in claim 6, wherein the dynamic achievement model further comprises a relationship between the fixed production schedule achievement rate and manufacturing capability.

8. The system as claimed in claim 7, wherein manufacturing capability limits deviation.

9. The system as claimed in claim 8, wherein the dynamic achievement model further provides an optimal working area based on the relationships to evaluate whether to adjust the fixed production schedule.

10. A computer implemented system for IC manufacturing planning in an IC foundry, comprising:
    a production database storing production information of the IC foundry;
    a capacity model considering a plurality of capacity vectors in the IC foundry;
    an order management module to receive an order for a product and reserve a capacity for the order based on the capacity model;
    a plan engine to generate a fixed production schedule for the order based on the capacity model;
    a dynamic achievement model of historical fixed production schedules based on historical production information in the production database;
    a production schedule monitor and evaluation module to determine whether the order in process conforms to the fixed production schedule and whether to adjust the fixed production schedule based on the dynamic achievement model when the order in process deviates from the fixed production schedule; and
    a production system to manufacture the order in accordance with the fixed production schedule.

11. The system as claimed in claim 10, wherein the plan engine generates a new fixed production schedule for the order in process according to a deviation when receiving an adjustment determination from the production schedule monitor and evaluation module.

12. The system as claimed in claim 10, wherein the order of the product is divided into a plurality of lots for production.

13. The system as claimed in claim 10, wherein the dynamic achievement model of historical fixed production schedules comprises a relationship between fixed production schedule achievement rate and fixed production schedule adjustment rate.

14. The system as claimed in claim 13, wherein the dynamic achievement model further comprises a relationship between the fixed production schedule achievement rate and manufacturing capability.

15. The system as claimed in claim 14, wherein the manufacturing capability limits deviation.

16. The system as claimed in claim 15, wherein the dynamic achievement model further provides an optimal working area based on the relationships to evaluate whether to adjust the fixed production schedule.

17. A system of a production schedule adjustment for IC production, comprising:
    a production database storing production information in an IC foundry;
    a plan engine to generate a fixed production schedule for an order produced in the IC foundry;
    a dynamic achievement model of historical fixed production schedules based on historical production information in the production database;
    a production schedule monitor and evaluation module to determine whether the order in process conforms to the fixed production schedule and whether to adjust the fixed production schedule based on the dynamic achievement model; and
    a production system to manufacture the order in accordance with the fixed production schedule.

18. The system as claimed in claim 17, wherein the order is divided into a plurality of lots.

19. The system as claimed in claim 18, wherein the dynamic achievement model of historical fixed production schedules comprises a relationship between fixed production schedule achievement rate and fixed production schedule adjustment rate.

20. The system as claimed in claim 19, wherein the dynamic achievement model further comprises a relationship between the fixed production schedule achievement rate and manufacturing capability.

21. The system as claimed in claim 20, wherein the manufacturing capability limits deviation.

22. The system as claimed in claim 21, wherein the dynamic achievement model further provides an optimal working area based on the relationships to evaluate whether to adjust the fixed production schedule.

23. A computer implemented method of manufacturing planning and control in an IC foundry, comprising the steps of:
    receiving an order of an IC product;
    reserving a capacity and generating a fixed production schedule for the order;

manufacturing the order according to the fixed production schedule; and determining whether the order in process conforms to the fixed production schedule; and determining whether to adjust the fixed production schedule based on a dynamic achievement model of historical fixed production schedules.

24. The method as claimed in claim 23, wherein the capacity is reserved based on a capacity model of the IC foundry.

25. The method as claimed in claim 23, wherein the order is divided into a plurality of lots.

26. The method as claimed in claim 23, wherein the dynamic achievement model of historical fixed production schedules comprises a relationship between fixed production schedule achievement rate and fixed production schedule adjustment rate.

27. The method as claimed in claim 26, wherein the dynamic achievement model further comprises a relationship between the fixed production schedule achievement rate and manufacturing capability.

28. The method as claimed in claim 27, wherein the manufacturing capability limits deviation.

29. The method as claimed in claim 28, wherein the dynamic achievement model further provides an optimal working area based on the relationships to evaluate whether to adjust the fixed production schedule.

30. A storage medium for storing a computer program providing a method of manufacturing planning and control in an IC foundry, using a computer to perform the steps of:
    receiving an order of an IC product;
    reserving a capacity and generating a fixed production schedule for the order;
    determining whether the order in process conforms to the fixed production schedule;
    determining whether to adjust the fixed production schedule referring to a dynamic achievement model of historical fixed production schedules; and
    manufacturing the order in accordance with the fixed production schedule.

31. The storage medium as claimed in claim 30, wherein the order is divided into a plurality of lots with the fixed production schedule.

32. The storage medium as claimed in claim 30, wherein the dynamic achievement model of historical fixed production schedules comprises a relationship between fixed production schedule achievement rate and fixed production schedule adjustment rate.

33. The storage medium as claimed in claim 32, wherein the dynamic achievement model further comprises a relationship between the fixed production schedule achievement rate and manufacturing capability.

34. The storage medium as claimed in claim 33, wherein the manufacturing capability limits deviation.

35. The storage medium as claimed in claim 34, wherein the dynamic achievement model further provides an optimal working area based on the relationships to evaluate whether to adjust the fixed production schedule.

36. A computer implemented system for manufacturing planning and control in a production system, comprising:
    a capacity model, considering a plurality of capacity vectors in the production system;
    an order management module to receive an order for a product and reserve a capacity for the order based on the capacity model;
    a plan engine to generate a fixed production schedule for the order based on the capacity model with a plurality of input parameters;
    a priority management module to assign a priority to the order in process; and
    a production schedule monitor and evaluation module to determine whether the order in process conforms to the fixed production schedule by statistical process control (SPC) and whether to adjust the fixed production schedule and to adjust the priority when the order in process deviates from the fixed production schedule,
    wherein the production system manufactures the order in accordance with the fixed production schedule.

37. The system as claimed in claim 36, wherein the production system is an integrated circuit (IC) foundry.

38. The system as claimed in claim 37, wherein the production schedule monitor and evaluation module comprises a statistical process control (SPC) model considering a plurality of SPC vectors to determine whether the order in process conforms to the fixed production schedule.

39. The system as claimed in claim 37, wherein the plan engine generates a new fixed production schedule for the order in process according to a deviation when receiving an adjustment determination from the production schedule monitor and evaluation module.

40. The system as claimed in claim 37, wherein the order of the product is divided into a plurality of lots for production.

41. The system as claimed in claim 40, further comprising a dynamic achievement model of historical fixed production schedules for the production schedule monitor and evaluation module to refer and determine the fixed production schedule adjustment accordingly.

42. The system as claimed in claim 41, wherein the dynamic achievement model of historical fixed production schedules comprises a relationship between fixed production schedule achievement rate and fixed production schedule adjustment rate.

43. The system as claimed in claim 42, wherein the dynamic achievement model further comprises a relationship between the fixed production schedule achievement rate and manufacturing capability.

44. The system as claimed in claim 43, wherein manufacturing capability limits deviation.

45. The system as claimed in claim 44, wherein the dynamic achievement model further provides an optimal working area based on the relationships to evaluate whether to adjust the fixed production schedule.

46. A computer implemented system for matching plan and execution in an IC foundry, comprising:
    a production database storing production information of the IC foundry;
    a capacity model considering a plurality of capacity vectors in the IC foundry;
    an order management module to receive an order for a product and reserve a capacity for the order based on the capacity model;
    a plan engine to generate a fixed production schedule for the order based on the capacity model;
    a dynamic achievement model of historical fixed production schedules based on historical production information in the production database;
    a priority management module to assign a priority to the order in process;
    a production schedule monitor and evaluation module to determine whether the order in process conforms to the fixed production schedule by statistical process control (SPC) and whether to adjust the fixed production schedule based on the dynamic achievement model and to adjust the priority when the order in process deviates from the fixed production schedule; and a production system to manufacture the order in accordance with the fixed production schedule.

47. The system as claimed in claim 46, wherein the plan engine generates a new fixed production schedule for the order in process according to a deviation when receiving an adjustment determination from the production schedule monitor and evaluation module.

48. The system as claimed in claim 46, wherein the order of the product is divided into a plurality of lots for production.

49. The system as claimed in claim 46, wherein the dynamic achievement model of historical fixed production schedules comprises a relationship between fixed production schedule achievement rate and fixed production schedule adjustment rate.

50. The system as claimed in claim 49, wherein the dynamic achievement model further comprises a relationship between the fixed production schedule achievement rate and manufacturing capability.

51. The system as claimed in claim 50, wherein the manufacturing capability limits deviation.

52. The system as claimed in claim 51, wherein the dynamic achievement model further provides an optimal working area based on the relationships to evaluate whether to adjust the fixed production schedule.

53. The system as claimed in claim 46, wherein the statistic tool is a SPC model.

54. A computer implemented method of execution matching in an IC foundry, comprising the steps of:
    receiving an order of an IC product;
    reserving a capacity and generating a fixed production schedule for the order;
    providing a priority for the order;
    manufacturing the order with the priority according to the fixed production schedule;
    determining whether the order in process conforms to the fixed production schedule with statistical process control (SPC);
    determining whether to adjust the priority for the order in process with statistical process control; and
    determining whether to adjust the fixed production schedule based on a dynamic achievement model of historical fixed production schedules.

55. The method as claimed in claim 54, wherein the capacity is reserved based on a capacity model of the IC foundry.

56. The method as claimed in claim 54, wherein the order is divided into a plurality of lots.

57. The method as claimed in claim 54, wherein the dynamic achievement model of historical fixed production schedules comprises a relationship between fixed production schedule achievement rate and fixed production schedule adjustment rate with an SPC tool.

58. The method as claimed in claim 57, wherein the dynamic achievement model further comprises a relationship between the fixed production schedule achievement rate and manufacturing capability.

59. The method as claimed in claim 58, wherein the manufacturing capability limits deviation.

60. The method as claimed in claim 59, wherein the dynamic achievement model further provides an optimal working area based on the relationships to evaluate whether to adjust the fixed production schedule.

* * * * *